US010688617B2

(12) United States Patent
Lazcano et al.

(10) Patent No.: US 10,688,617 B2
(45) Date of Patent: Jun. 23, 2020

(54) MACHINE TOOL (75) Inventors: Francisco Ayestaran Lazcano, Elgoibar (ES); Jorge Ibarra Garces, Elgoibar (ES)

(73) Assignee: ETXE-TAR, S.A., Elgoibar (Guipuzcoa) (ES)

(*) Notice: Subject to any disclaimer, the term of this patent is extended or adjusted under 35 U.S.C. 154(b) by 1069 days.

(21) Appl. No.: 14/117,203

(22) PCT Filed: May 13, 2011

(86) PCT No.: PCT/ES2011/070345
§ 371 (c)(1),
(2), (4) Date: Sep. 4, 2014

(87) PCT Pub. No.: WO2012/156541
PCT Pub. Date: Nov. 22, 2012

(65) Prior Publication Data
US 2014/0373352 A1 Dec. 25, 2014

(51) Int. Cl.
*B23Q 39/02* (2006.01)
*B23B 39/18* (2006.01)
*B23Q 39/00* (2006.01)

(52) U.S. Cl.
CPC ............ *B23Q 39/024* (2013.01); *B23B 39/18* (2013.01); *B23Q 2039/006* (2013.01);
(Continued)

(58) Field of Classification Search
CPC .. B23Q 39/021; B23Q 39/022; B23Q 39/024; B23Q 39/04; B23Q 39/18;
(Continued)

(56) References Cited

U.S. PATENT DOCUMENTS 2,614,446 A * 10/1952 Miller ...................... B23B 3/30
279/158
5,781,983 A 7/1998 Gruner
(Continued)

FOREIGN PATENT DOCUMENTS

CN 1895843 A 1/2007
CN 101193727 A 6/2008
(Continued)

OTHER PUBLICATIONS

EPO Machine Translation of DE102006021946—Gerst et al., "Machine tool for working on work pieces," Nov. 15, 2007.*
(Continued)

*Primary Examiner* — Sunil K Singh
*Assistant Examiner* — Michael Vitale (57) ABSTRACT

Machine tool, comprising
a workpiece carrier assembly (11) including a workpiece carrier (12), said workpiece carrier assembly (11) being supported on a workpiece carrier support (1) for horizontal movement in a first direction in parallel with a horizontal Z axis;
a first tool carrier (21), supported on a tool carrier support (2) for horizontal movement in a second direction, said first tool carrier (21) being displaceable in said second direction between an operative position in which said first tool carrier (21) is facing said workpiece carrier assembly (11), and an inoperative position in which said first tool carrier (21) is not facing the workpiece carrier assembly (11).
The invention also relates to a method of machining a connecting rod using the machine tool.

15 Claims, 6 Drawing Sheets

(52) U.S. Cl.
CPC ...... *Y10T 29/49288* (2015.01); *Y10T 29/5107* (2015.01); *Y10T 409/308344* (2015.01); *Y10T 409/308568* (2015.01)

(58) Field of Classification Search
CPC ........ B23Q 2039/002; B23Q 2039/006; B23B 39/18; B23P 2700/04; Y10T 29/5105; Y10T 29/5107; Y10T 409/307168; Y10T 409/307784; Y10T 409/308344; Y10T 409/308568
USPC ........ 409/192, 203, 213, 217; 29/26 A, 26 R
See application file for complete search history.

(56) References Cited

U.S. PATENT DOCUMENTS

| | | | |
|---|---|---|---|
| 5,908,270 A * | 6/1999 | Araki | B23Q 11/0039 408/1 R |
| 7,442,154 B2 | 10/2008 | Boehler | |
| 7,926,155 B2 | 4/2011 | Grossmann | |
| 8,210,907 B2 | 7/2012 | Walter et al. | |
| 8,875,604 B2 * | 11/2014 | Tsuyusaki | B23B 3/30 82/121 |
| 2004/0154157 A1 | 8/2004 | Hessbruggen et al. | |
| 2004/0176229 A1 | 9/2004 | Soroka | |
| 2005/0005443 A1 * | 1/2005 | Arnold | B23K 26/38 29/888.09 |
| 2007/0015646 A1 | 1/2007 | Prust et al. | |
| 2008/0089751 A1 | 4/2008 | Hutter | |
| 2008/0213057 A1 | 9/2008 | Betschon et al. | |
| 2009/0082184 A1 | 3/2009 | Grossmann | |
| 2009/0123245 A1 | 5/2009 | Lombacher | |
| 2011/0131791 A1 | 6/2011 | Haas et al. | |

FOREIGN PATENT DOCUMENTS

| | | | | |
|---|---|---|---|---|
| DE | 2852875 A1 * | 6/1980 | .......... | B23B 39/161 |
| DE | 198 60 867 | 7/2000 | | |
| DE | 102006021946 A1 * | 11/2007 | .......... | B23Q 39/024 |
| DE | 10 2006 026186 | 12/2007 | | |
| DE | 10 2006 048495 | 4/2008 | | |
| DE | 102006048495 A1 * | 4/2008 | .......... | B23Q 39/024 |
| DE | 10 2008 014779 | 9/2009 | | |
| EP | 1002620 | 5/2000 | | |
| EP | 1 500 465 A2 | 1/2005 | | |
| EP | 1992449 | 11/2008 | | |
| EP | 2 246 136 A1 | 11/2010 | | |
| ES | 2332073 T3 | 5/2007 | | |
| GB | 2167325 A * | 5/1986 | .......... | B23Q 3/15526 |
| GB | 2271945 A * | 5/1994 | .............. | B23Q 1/48 |
| WO | WO 2007/137691 | 12/2007 | | |
| WO | 2010/088181 A2 | 8/2010 | | |

OTHER PUBLICATIONS

EPO Machine Translation of the Claims of DE102006021946—Gerst et al., "Machine tool for working on work pieces," Nov. 15, 2007.*
Chinese Office Action dated Apr. 1, 2016 issued in CN Patent Application No. 2012800751739.
Notification of the First Office Action received in Chinese Application No. 201180071205.3 dated Jun. 3, 2015, and an English language translation thereof.
European Patent Office, European Patent Application No. 12 787 035.0, Office Action dated Jul. 17, 2018, 5 pages.
Indian Intellectual Property Office, Indian Application No. 9856/DELNP/2013, Office Action dated Nov. 3, 2019, 6 pages, with English translation.

* cited by examiner

MACHINE TOOL

CROSS-REFERENCE TO RELATED APPLICATIONS

This is a national stage application of International Application No. PCT/ES2011/070345, filed May 13, 2011, the entire contents of which are hereby incorporated by reference.

FIELD OF THE INVENTION

The invention is related to the field of machine tools.

STATE OF THE ART

Machine tools are used for machining workpieces, such as work pieces of metal, to provide them with the desired shape and configuration, for example, by drilling or boring holes in the workpieces and/or by machining edges to give them a desired, for example, a bevelled, shape. For example, the machining of a connecting rod for connecting the piston to the crankshaft of a reciprocating piston engine involves several different operations which can be performed in one machine tool or sequentially in different machine tools, which can be different or which can have the same basic design but being equipped with different tools, adapted to performing the specific operations. For example, machining this kind of connecting rod can typically include several or all of the following steps:

rough grinding of the surfaces of the blank
rough boring of the pin hole and the crank hole
machining bolt holes and seats
cracking the connecting rod (body and cap) and bolts assembly
finish grinding of the surfaces
milling trapezoid and semifinishing crank hole
finish boring pin hole and crank hole.

Figure 1A:
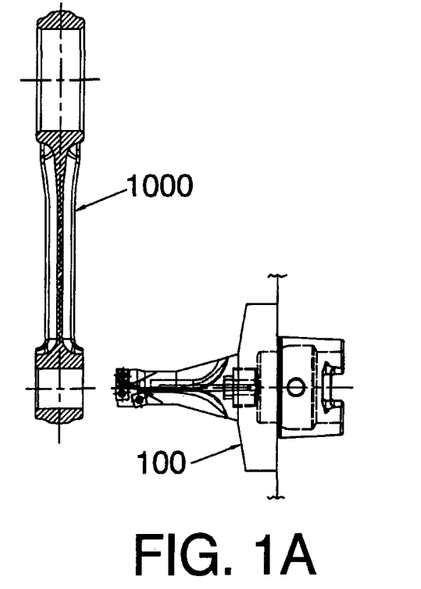
FIGS. 1A-1D schematically illustrate some operations which can be carried out when machining a connecting rod out of a rod blank, involving the use of different tools.
Figure 1B:
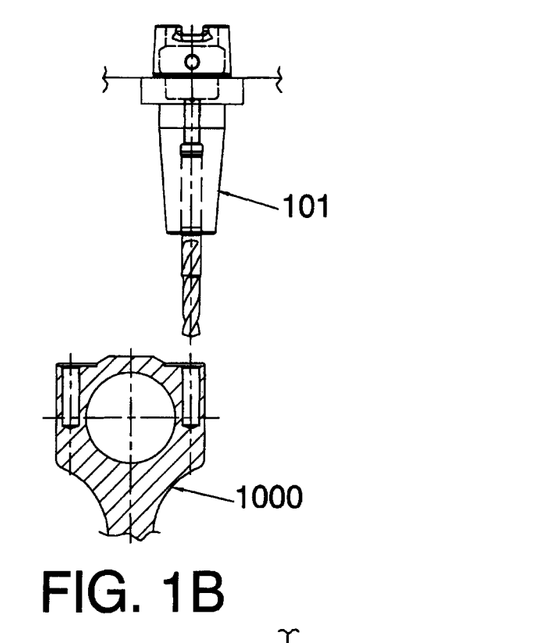
Figure 1C:
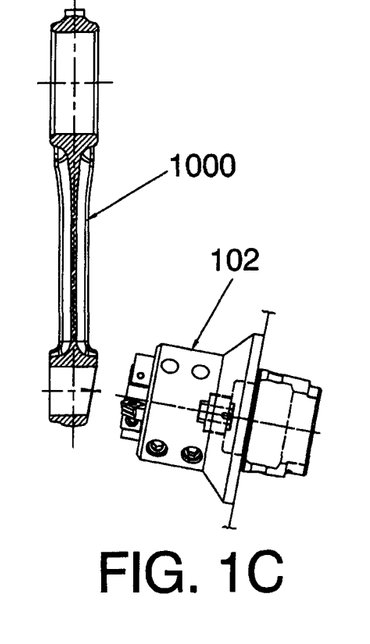
Figure 1D:
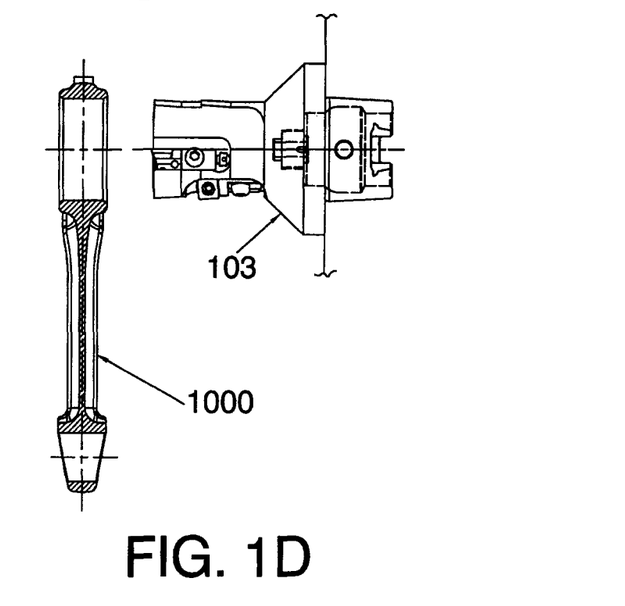

For example, FIGS. 1A-1D show how some of these operations can be carried out on a connecting rod blank 1000 by using different tools 100, 101,102,103 which can be connected to respective spindle heads to be driven by a spindle, for rotary movement about, for example, a horizontal Z axis (not illustrated in FIG. 1), in a conventional manner. For example, FIG. 1A shows boring of the pin hole with a first tool 100, FIG. 1B shows the machining of bolt holes using a second tool 101, FIG. 1C shows the milling of a trapezoidal end of the blank using a third tool 102, and FIG. 1D shows boring of the crank hole using a fourth tool 103. All of these steps can be carried out by one machine tool, in which the different tools are mounted simultaneously or sequentially. It is, of course, also possible to carry out different steps using different machine tools.

Machines of this type are normally provided with some kind of tool carrier, in which the tools can be replaced depending on the task to be performed by the machine at a certain time or for a certain period. In this specification, the term "tool" is to be interpreted in a generic sense, and can, but must not, include an associated spindle head.

Machine tools for performing machining operations such as drilling and milling, for example, by rotary motion of a tool, for example, for shaping and boring connecting rods for reciprocating piston engines, are well known in the art, and it is thus not considered necessary to describe the operation of a tool drive or of a tool holding mechanism, as the skilled person is aware of how to design this kind of equipment and as appropriate devices are commercially available.

Machine tools are conventionally numerically controlled and in machine tools with rotary tools, machining is performed by producing a controlled relative movement between the workpiece and the corresponding tool. For example, it is known to provide a machine with one or more fixed tools, and to move one or more workpieces, such as a workpiece or blank out of which a connecting rod is to be obtained, in relation to the fixed tool, for example, in parallel with a horizontal Z axis (the Z axis can be the axis around which a tool rotates, or an axis parallel with that axis), in parallel with an X axis which can be a horizontal axis perpendicular to the Z axis, and in parallel with a Y axis which can be a vertical axis.

U.S. Pat. No. 7,442,154 discloses a machine tool comprising a frame in which tools can be mounted in tool carriers, which can be tool spindles. Different tools can be applied at different heights of the frame. A workpiece carrier is provided which can move a workpiece in three different, orthogonal, directions, that is, in a vertical "Y" direction and in two perpendicular horizontal directions, referred to as "X" and "Z". The workpiece carrier can also be rotated around the "Z" axis.

Another example of this kind of machine is known from WO-A-2008/089751, which discloses a machine tool based on a reticular frame structure, in which tools can be fixed. The machine tool includes a workpiece carrier which can be displaced along an X-Y-Z guide.

In both of these machines, the tool carriers are arranged in an overhanging manner, cf., for example, FIG. 1 of U.S. Pat. No. 7,442,154 and FIG. 12 of WO-A-2008/089751. It is believed that this can, at least in some cases, be a problem, for example, when substantive forces are exerted on the tool carrier, which may occur, for example, when machining connecting rods. Thus, attention must be paid to the resistance and rigidity of the work piece carrier (including the structure for guiding it), that is, for example, the resistance and rigidity of the quill shown in WO-A-2008/089751.

Also, it is observed that when replacing the tools in the machine of U.S. Pat. No. 7,442,154, the operator must access the space within the tool holding frame. Similarly, when replacing the tools in a machine tool as known from WO-A-2008/089751, the operator will need to access the space within the reticular frame. However, this space is limited, inter alia due to the presence of the quill and tools. Similar problems appear to apply when accessing the workpiece carrier for replacing workpieces, or for replacing the workpiece carrier itself, or parts thereof.

At least some of these problems can be even more serious when the tools and/or work piece carrier are placed high up. In the machines known from U.S. Pat. No. 7,442,154 and WO-A-2008/089751, flexibility can be enhanced by incorporating different kinds of tools into the frame, these tools being distributed in the vertical direction of the frame. This can, however, imply that at least some of the tools may be placed at a substantial height over the surface on which an operator will stand when manipulating, for example, the tools during a tool maintenance or replacement process, and/or that at least some of the tools may be placed very low. In both cases, the operator may have to adopt an ergonomically unfavourable position when manipulating the tools.

DESCRIPTION OF THE INVENTION

A first aspect of the invention relates to a machine tool, comprising:

a workpiece carrier assembly (for example, a structurally stable, resistand and/or rigid carriage) including a workpiece carrier for supporting at least one workpiece (the workpiece carrier assembly can be, for example, a structure such as a metal structure arranged to provide for sufficient stability and rigidity to substantially avoid undesired movement of the workpiece carrier and the workpieces during machining; the workpiece carrier can be arranged for supporting a plurality of worpieces, for example, 4-8 workpieces);

a workpiece carrier support, said workpiece carrier assembly being supported on said workpiece carrier support for horizontal movement in a first direction on said workpiece carrier support, said first direction being parallel with a horizontal Z axis;

at least a first tool carrier configured for carrying at least one tool for machining at least one workpiece by rotating said tool around an axis parallel with said Z axis (the tool carrier can typically incorporate one or more spindles and spindle heads arranged to rotate one or more tools);

a tool carrier support, said first tool carrier being supported on said tool carrier support for horizontal movement in a second direction on said tool carrier support, said second direction being parallel with a horizontal X axis, said X axis being perpendicular to said Z axis (that is, for example, the workpiece carrier assembly with the workpiece carrier can be considered to be moveable backwards and forwards along the workpiece carrier support, whereas the tool carrier can be considered to be moveable in a lateral direction along the tool carrier support);

said first tool carrier being displaceable on said tool carrier support in said second direction between an operative position in which said first tool carrier is facing said workpiece carrier assembly (so that when the machine is operating, one or more tools carried by said first tool carrier can interact with one or more workpieces carried by the workpiece carrier, for machining of the workpieces by movement of the workpiece carrier and/or the tool or tools), and an inoperative position in which said first tool carrier is not facing the workpiece carrier assembly.

Thus, when the first tool carrier is not facing the workpiece carrier assembly but is, basically, laterally offset with regard to said workpiece carrier assembly, it is easy to replace tools also at the front end of the first tool carrier (that is, at the end that is facing the workpiece carrier assembly when the first tool carrier is in the operative position). That is, an operator can access the tools from the front without having to enter or access the space between the workpiece carrier assembly and the tool carrier. Thus, the arrangement provides for ergonomy and flexibility. Also, the fact that the tool carrier is displaceable in the lateral direction further provides for flexibility in production, as several tool carriers can be provided which selectively can be brought to the operative position, depending on the specific machining operations that are to be carried out.

Also, the fact that both the tool carrier and the workpiece carrier assembly are moveable on respective supports provides for stability and rigidity. This can be especially desirable in connection with the machining of connecting rods, as this kind of machining implies that large forces are exerted on the workpieces, and the manufacturing tolerances are often very small. Also, the structural stability of this kind of workpieces is often small. Thus, stability and rigidity of the components involved in the machining, including tools, tool carriers and workpiece carrier, are important.

The machine tool can further comprise a second tool carrier, said second tool carrier being configured for carrying at least one tool for machining at least one workpiece by rotating said tool around an axis parallel with said Z axis, said second tool carrier being supported on said tool carrier support for horizontal movement in the second direction, between an operative position in which said second tool carrier is facing said workpiece carrier assembly, and an inoperative position in which said second tool carrier is not facing said workpiece carrier assembly.

By using two (or more) separate tool carriers that can be selectively moved between the operative position (or positions) and respective inoperative positions, several additional advantages can be obtained. Not only does the inoperative position allow for more flexibility and easy access for replacement of tools, but the fact that there are two (or more) tool carriers implies that one of them can be used for machining, while maintenance and/or replacement of tools can be carried out on the other(s). Also, the use of a plurality of tool carriers, such as two or more tool carriers, provide for the possibility of having a relatively large variety of tools ready for use (that is, mounted on a respective tool carrier), without any need for arranging the tools over a large range in the vertical direction. For example, assuming that each tool carrier has, for example, N (for example, 2) rows of tools each comprising, for example, M (for example, 4) tools, the first and the second tool carrier together can hold 2×N×M (for example, 16) tools. Thus, for example, at any given moment the two (2) tool carriers together can hold two (2) different sets of N×M tools, or four (4) different sets of N×M/2 tools, distributed along only N rows (for example, two (2) rows) in the vertical direction. That is, due to the lateral movement of the tool carriers, a high variety of tools can be mounted "ready for use" in the different tool carriers, while maintaining the tools within a relatively short extension in the vertical direction. This can be advantageous as it implies that all of the tools can be arranged at a height at which manipulation of the tools, for example, replacement of tools, can be carried out by the operator under ergonomic conditions, for example, without having to bend over excessively, and/or without having to climb ladders or similar.

The workpiece carrier support can extend towards a central portion of the tool carrier support, and the tool carrier support can further comprise two side portions, whereby the inoperative position of the first tool carrier) corresponds to one of said side portions, and wherein the inoperative position of the second tool carrier corresponds to the other side portion. In this way, by simply shifting the tool carriers to their respective side portions of the tool carrier support, one set of tools can replace another set of tools during operation of the machine. For example, after termination of a certain cycle of machining, the operative tool carrier can be shifted sideways to its inoperative position, and the inoperative tool carrier can be shifted to its operative position. This configuration has been found to be practical and allows for a flexible use of the tool carriers, while the total amount of space that is needed is rather limited. The entire length of the tool carrier support, when two tool carriers are used, can be limited to approximately three times the width of each tool carrier, so as to accommodate for the two inoperative positions and the operative position.

The workpiece carrier support and the tool carrier support can, together, have a T configuration, when viewed from above. It is also possible for the workpiece carrier support and the tool carrier support to have, together, for example, an L or "⌐" configuration, when viewed from above, for example, if there is only one tool carrier.

In one possible implementation of the invention, all of the tools, when mounted in the respective tool carrier, can be placed at a height of not less than 0.7 m, preferably not less than 1.1 m, and not more than 1.8 m, preferably not more than 1.5 m, over a floor or similar, said floor being a floor on which an operator walks when servicing the machine tool, for example, by replacing the tools mounted in the tool carriers. In this way, the operator can manipulate the tools while adopting a comfortable and ergonomically correct position, and without any need for climbing ladders or similar.

Said first tool carrier can comprise N rows of tools, 1≤N≤5, for example, N=2 or N=3 or N=4. By using a rather low number of rows, all of the tools can be kept at a height that allow easy manipulation of the tools by an operator.

The workpiece carrier can be mounted on the workpiece carrier assembly so that the workpiece carrier is displaceable in the vertical direction, that is, in parallel with a vertical Y axis. In this way, by the arrangement described so far, relative movement between tools and workpieces is provided along the Z, X and Y axes.

Obviously, additional degrees of freedom, such as, for example, rotation of the workpiece carrier around an axis, such as around an axis parallel with the Z axis, is not excluded from the scope of the present invention.

The workpiece carrier support and the tool carrier support can be placed on a floor or similar support surface, and can be arranged to support the workpiece carrier assembly and the tool carriers from below. It can sometimes be preferred that none of the tool carriers or the workpiece carrier assembly hang from overhead supports; the use of simple ground supports placed on the floor can be preferred, for example, due to simplicity of installation.

The workpiece carrier support and the tool carrier support can have a height of not more than 1.1 m, preferably not more than 0.6 m. In this way, the tool carriers can be placed relatively low, facilitating access to the tools.

The machine tool can be a machine tool for machining connecting rods for a reciprocating piston engine, preferably a reciprocating piston engine of an automobile or a truck. The machining of connecting rods for a reciprocating piston engine, such as a reciprocating piston engine of an internal combustion motor of an automobile or a truck, is a task that involves certain specific considerations, and for which, traditionally, rather specific machines have been used. The machine tool of the present invention can involve advantages in terms of stability and rigidity, as explained above.

Another aspect of the invention relates to a method for machining connecting rods for a reciprocating piston engine, such as a reciprocating piston engine of an automobile or a truck. The method comprises subjecting a rod blank to a plurality of machining steps, wherein at least one of said machining steps is carried out by a machine tool as described above. For example, a plurality of said machining steps can carried out by the same machine tool. In one possible implementation of the invention, between at least two of said machining steps, the first tool carrier is switched from its operative position to its inoperative position, or from its inoperative position to its operative position. If there is a second tool carrier, this second tool carrier can be shifted in a corresponding manner. For example, for machining a connecting rod, tools mounted on the first tool carrier can be used for one or more of the machining steps, and tools mounted on the second tool carrier can be used for one or more further machining steps.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be embodied. The drawings comprise the following figures.

DESCRIPTION OF AN EMBODIMENT OF THE INVENTION

One possible embodiment of the invention is shown in FIGS. 2-5. The machine tool comprises a workpiece carrier assembly 11 on which a workpiece carrier 12 is mounted, so that it is displaceable in parallel with a vertical Y axis, along guide rails 13. This vertical movement of the work piece carrier along the guide rails 13 can be achieved by conventional means, such as by a servo motor drive system 20, which can be controlled by a computer 50 of the machine tool (schematically illustrated in FIG. 5). By means of the vertical movement, the workpiece carrier 12 can be positioned at a desired height for receiving workpieces from a supply device (not illustrated), for delivering machined workpieces, for positioning the workpieces at the right height for interaction with the tools for machining, and for displacing the workpieces vertically during machining.

The workpiece carrier assembly 11 is a carriage designed for stability and rigidity so that the workpieces can be kept in their accurate position during interaction with the tools. The carriage is supported on a workpiece carrier support 1, which includes horizontal rails 14 (cf. FIG. 4), extending along or in parallel with a horizontal Z axis. The workpiece carrier assembly or carriage is supported and guided by the guide rails for horizontal movement in parallel with said Z axis. The machine tool includes a drive system 15, such as a servo motor drive system, for displacing the workpiece carrier assembly 11 along the guide rails 14, in a controlled manner, for example, controlled by the computer 50. By means of its horizontal movement, the workpiece carrier assembly can, for example, be placed in a certain position for loading/unloading workpieces, be placed in a position for initiating machining (by interaction of the tools with the workpieces), and be displaced horizontally during machining, for displacing the workpieces with regard to the tools.

In this embodiment, the workpiece carrier assembly 11 or carriage rests on the workpiece carrier support 1, that is, it does not hang above it. This arrangement can thus help to improve stability, rigidity and can also facilitate installation of the machine tool, compared to installations with, for example, an overhanging quill. Rigidity may be especially important when the workpieces are, for example, blanks for connecting rods, as the tolerances are small while the structural rigidity of the blank is often relatively low.

The machine tool further includes two tool carriers 21 and 22, which are supported on a tool carrier support 2 extending along, or in parallel with, a horizontal X axis, which is perpendicular to the Z axis. The tool carrier support 2 is arranged at one end of the workpiece carrier support 1, which meets the tool carrier support 2 approximately at the middle of the tool carrier support 2, whereby the tool carrier support and the workpiece carrier support together form a "T" layout when viewed from above. The tool carrier support 2 includes on its upper surface two horizontal guide rails 16, on which the two tool carriers 21 and 22 are supported and along which they are guided in parallel with said X axis, controllably driven by a drive system 17, for example a servo motor drive system, operation of which can be controlled by the computer 50.

The first tool carrier 21 is displaceable along the tool carrier support 2 between an operative postion (in which it faces the workpiece carrier assembly 11 and in which the tools mounted in the tool carrier can thus act on the workpiece blanks mounted in the workpiece carrier 12), and an inoperative position, in which it does not face the workpiece carrier assembly, but is laterally offset with regard to said workpiece carrier assembly. In FIGS. 2-5, the first tool carrier 21 is in the inoperative position. Thus, in this position, an operator can manipulate the tools, for example, inspect or replace the tools 102 and 103 mounted on the first tool carrier 21, without having the enter the space between the workpiece carrier assembly 11 and the tool carrier 21. Thus, as illustrated in FIGS. 2-5, manipulation of the tools is easy. It can be observed how the first tool carrier 21, when in the inoperative position, is close to a first end of the tool carrier support 2.

Figure 2:
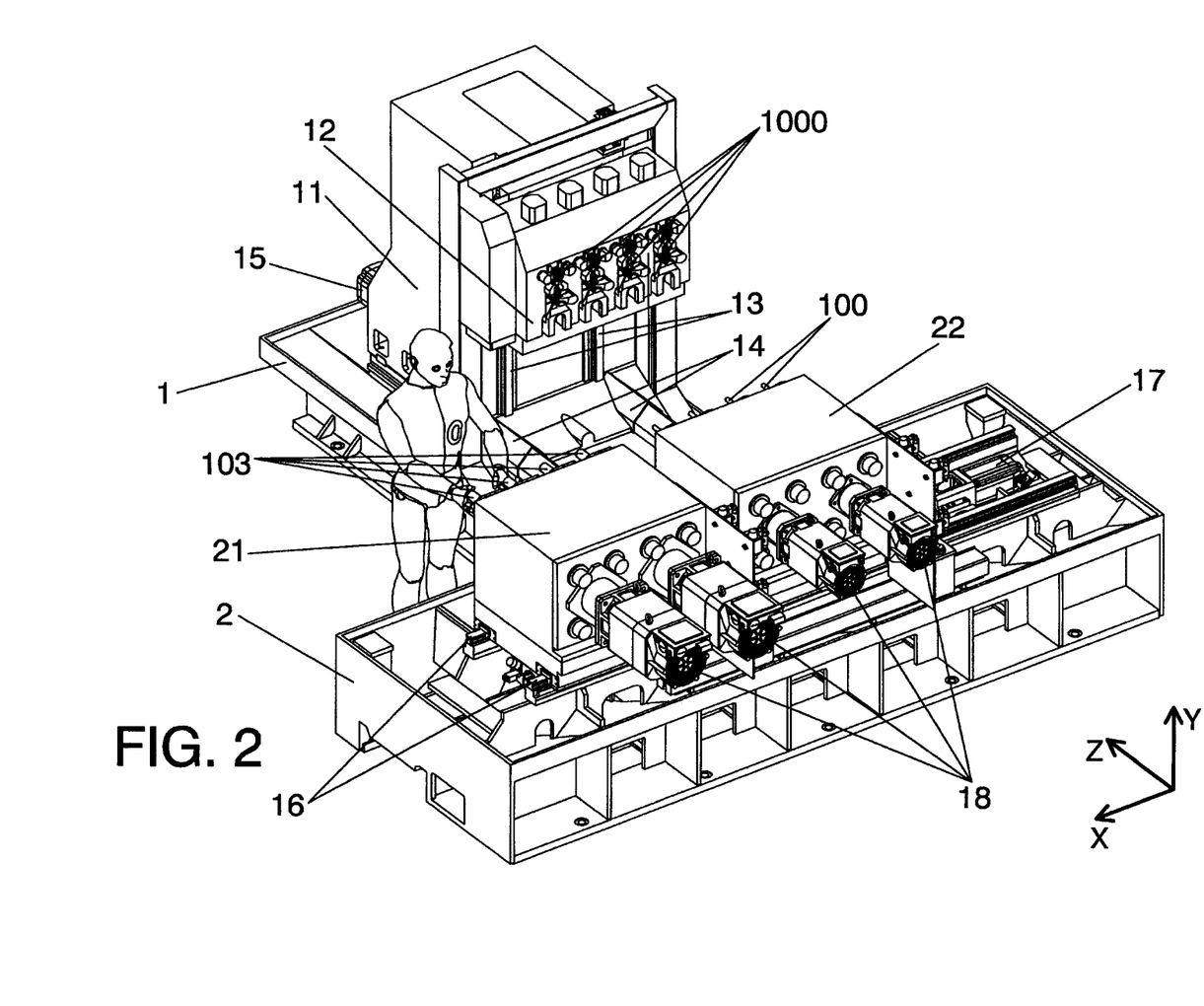
FIGS. 2-5 are schematic perspective views of a machine tool according to an embodiment of the invention.
Figure 3:
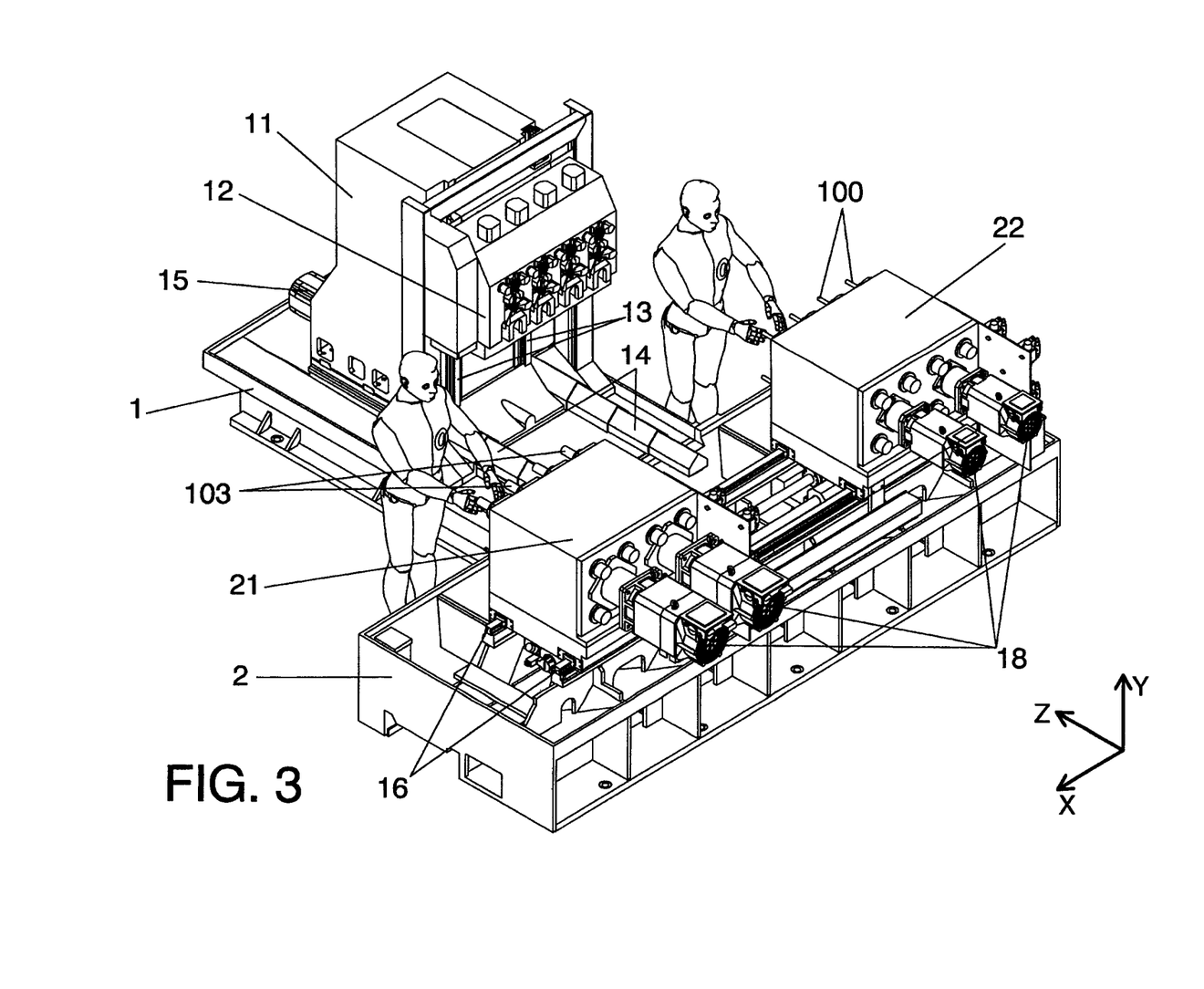
Figure 4:
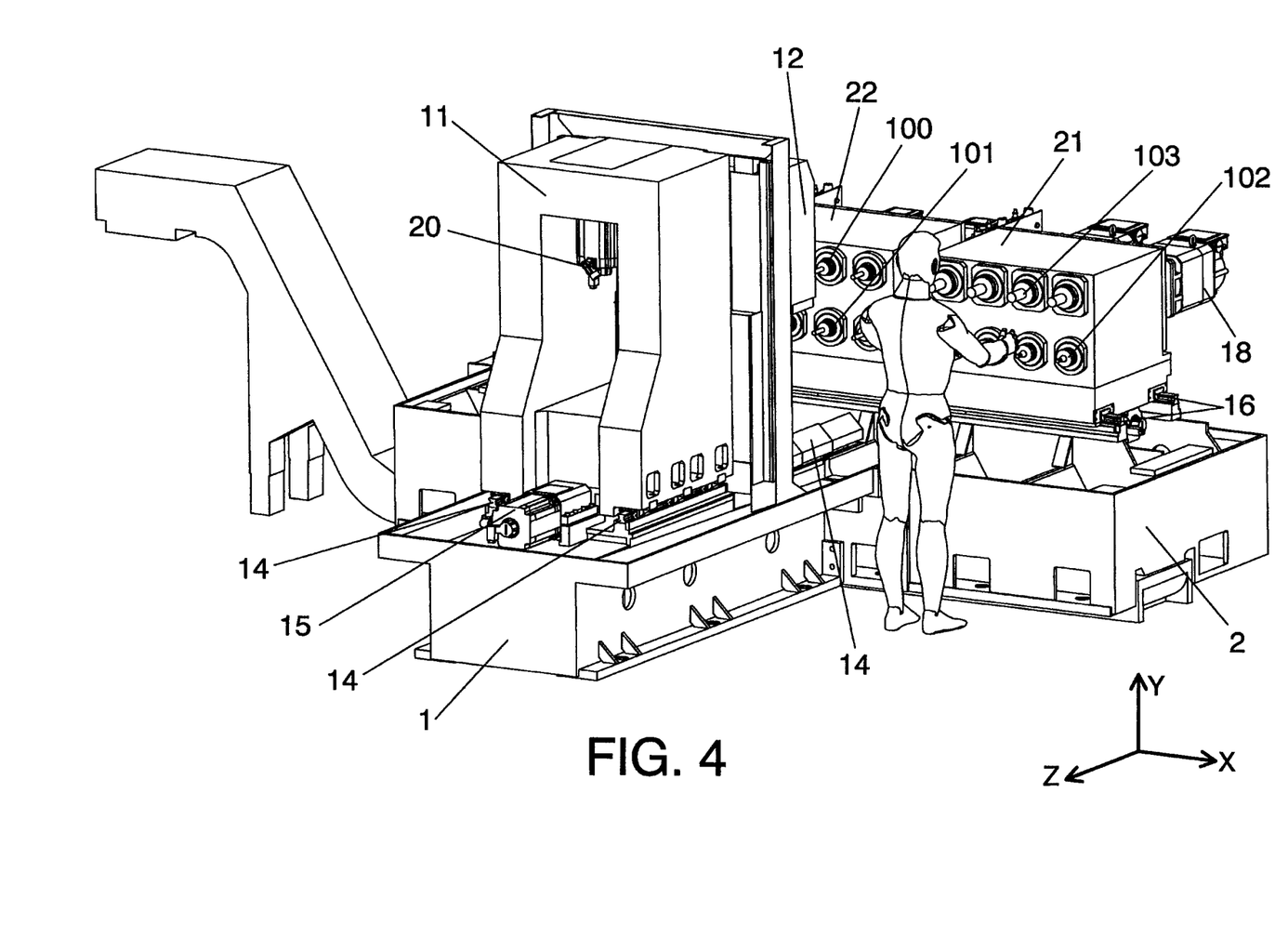
Figure 5:
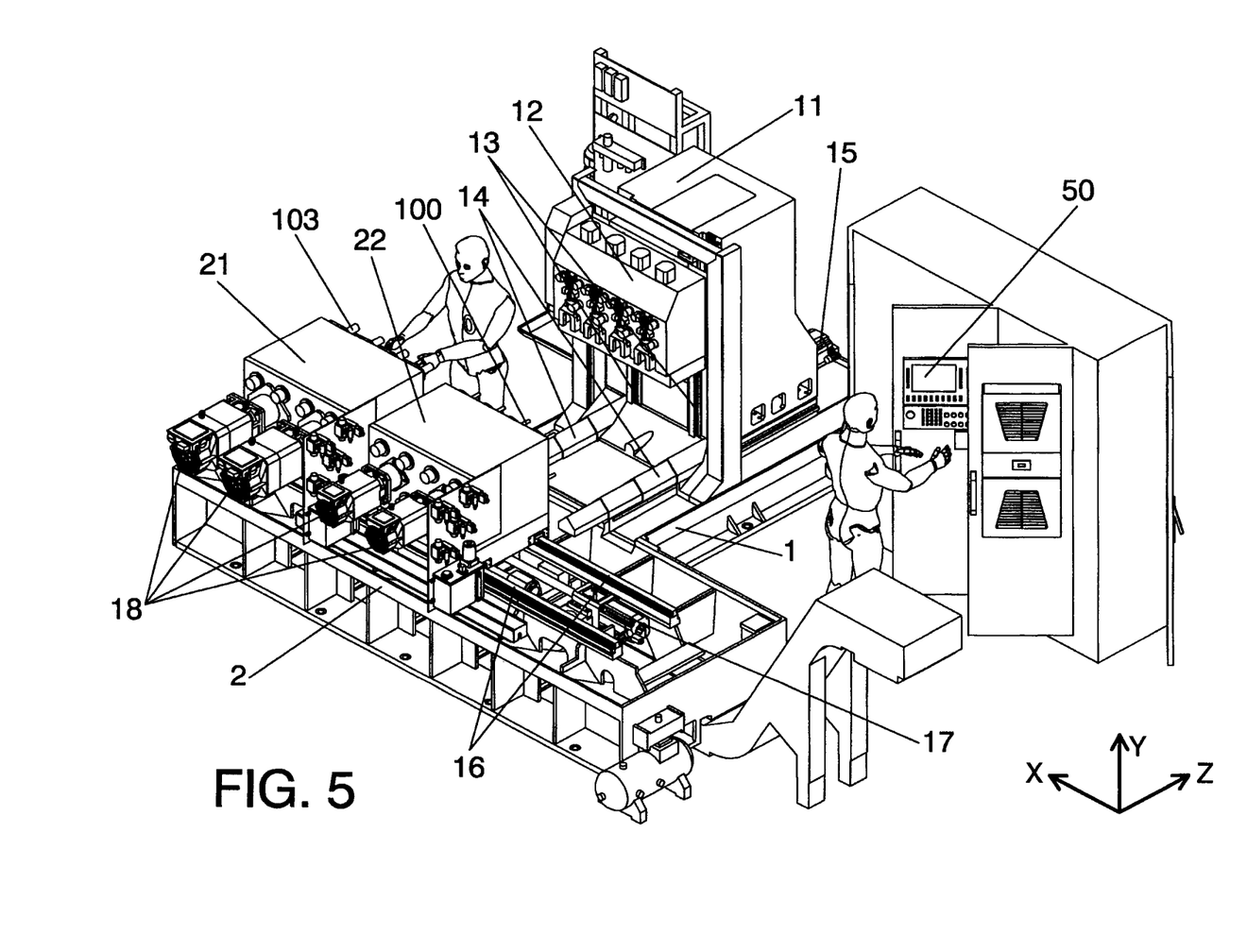

Also the second tool carrier 22 can be displaced between an operative position, in which it faces the workpiece carrier assembly 11, and an inoperative position, laterally offset from said operative position. In FIGS. 2, 4 and 5, the second tool carrier 22 is in the operative position (at the center portion of the tool carrier support), and in FIG. 3 the second tool carrier 22 is in its inoperative position, close to a second end of the tool carrier support 2.

Also the tool carriers 21 and 22 are designed for stability and rigidity, and they are stably supported on the tool carrier support 2.

The lateral displacement of the tool carriers 20, 21 in parallel with the X axis does not only serve to selectively bring the tool carriers into and out of the operative position, but also serves for positioning the tool carriers (and the tools) in the right position (along the X axis) for initiating machining, and for displacing the tool carriers (and, thus, the tools) along the X axis during machining.

The movement of tool carrier and workpiece carrier in the "X", "Y" and "Z" directions can be simultaneous. Simultaneous movement along more than one axis during machining can be helpful for performing certain operations.

Each tool carrier has, at a front end thereof, a plurality of rows of tools, for example two (2) rows of tools, each row comprising a plurality of tools, such as four (4) tools. For example, one tool carrier 21 can have one row of tools with a first kind of tool 103, and one row of tools with a second kind of tool 102, whereas the other tool carrier 22 can have one row of tools with a third kind of tool 100, and a second row of tools with a fourth kind of tool 101. For example, each row of tools can comprise four (4) tools of the same kind. The workpiece carrier can be arranged to support four (4) workpiece blanks 1000.

Thus, in this embodiment, sixteen tools of four different kinds are provided. Due to the fact that there are two tool carriers which selectively can be brought to the operative position, only two rows are needed to accommodate the 4×4=16 tools. If only one fixed tool carrier had been used, accommodating these tools while allowing interaction with one row of four (4) workpieces, would have required the use of four rows of tools, which would have increased the distance along which the tools would have to be arranged in the vertical direction. By means of an arrangement as shown in FIGS. 2-5, all of the tools can be placed within a very small vertical range, for example, the lowermost row of tools on the tool carriers can be arranged at a height of not less than 0.7 m, such as not less than 1.1 m, and not more than 1.8 m, such as not more than 1.5 m, over the floor or surface on which the operator will stand when manipulating the tools. In this way, the tools can be manipulated under ergonomically favourable conditions: the height at which the tools are placed makes manipulation comfortable, and as the tool carriers are laterally offset from the workpiece carrier 12 and the workpiece carrier assembly 11 when the tools are to be manipulated by the operator, the operator is not disturbed by the workpiece carrier 12 or the workpiece carrier assembly 11.

With this arrangement, several different operations can be carried out on the workpieces, such as connecting rod blanks, without changing the tools, by using the tools at different rows of the tool carriers, and, when necessary, by switching the tool carriers sideways, so that the tool carrier that was at its inoperative position enters the operative position, and vice-versa. Also, if further tools are needed, or if tools need to be replaced, this can be handled easily by an operator, for example, as illustrated in FIG. 2, by manipulating the tools of an inoperative tool carrier while the other tool carrier is operative (or not).

Also the height of the workpiece carrier support (1) and the tool carrier support (2) can be kept low, for example, at less than 1.1 m or at less than 0.6 m. In some embodiments of the invention, all guide rails can be kept at less than 1.1 m, 0.8 m, 0.7 m, 0.6 m or 0.5 m.

In the described embodiment, the absence of quills and similar overhanging structures can be advantageous, in terms of stability and in terms of simplicity of installation. In the described embodiment, both the workpiece carrier assembly and the tool carriers are driven along and on top of fixed and stable supports. All the tools can be arranged at a height at which they can be manipulated by operators under ergonomically satisfactory conditions.

The tools can be driven by spindles motor 18, for example, via multiple spindle heads. This is conventional in the art and these drive mechanisms do thus not need to be discussed herein. Any suitable conventional or non-conventional kind of drive mechanism can be used. Also, the tool carriers can also be provided with cooling means, for example, with nozzles for ejecting a cooling liquid or fluid for cooling the tools and/or blank during operation.

The tools can be arranged for rotation around an axis parallel to the Z axis.

Figure 6:
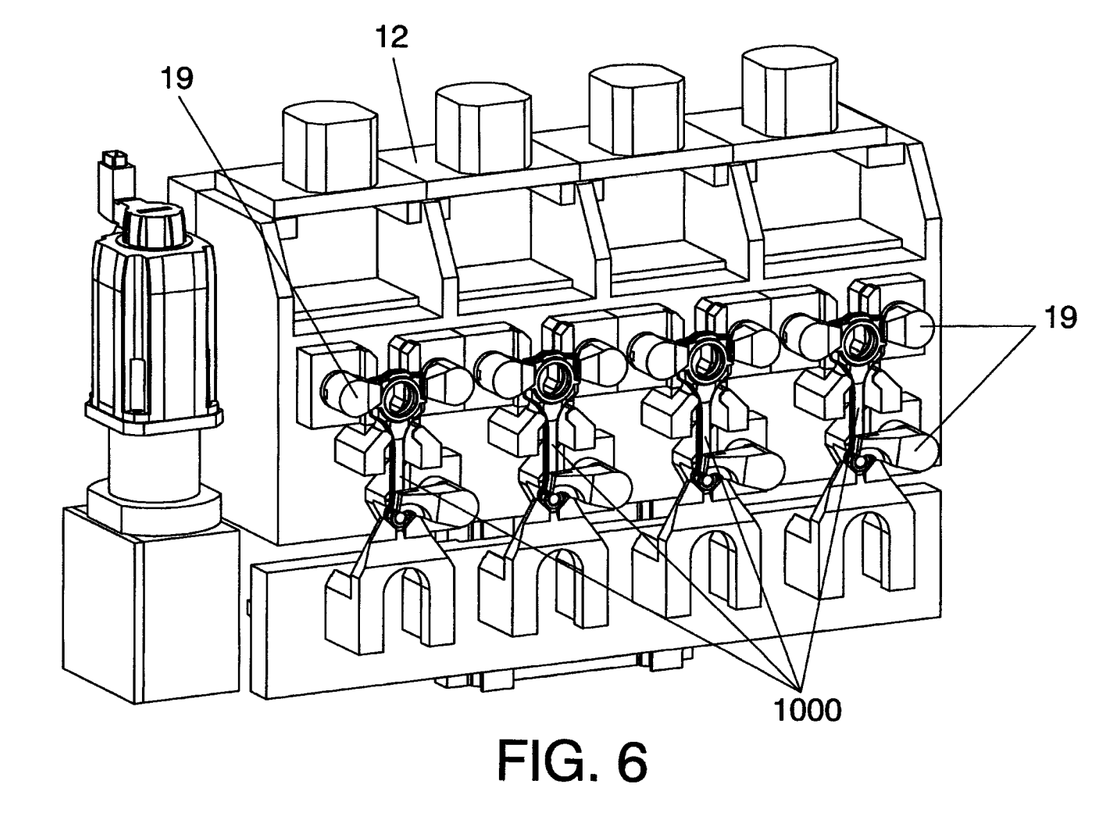
FIG. 6 is a schematic perspective view of a workpiece carrier that can be used in an embodiment of the invention.

Any kind of suitable workpiece carrier can be used. FIG. 6 just illustrates an example of one possible layout of the workpiece carrier, with hydraulically or pneumatically operated, pivotably arranged blocking elements 19 for blocking the workpieces 1000 in the correct position for machining.

LIST OF REFERENCE NUMBERS USED IN THE DESCRIPTION 1 workpiece carrier support
2 tool carrier support
11 workpiece carrier assembly
12 workpiece carrier
13 vertical guide rails on the workpiece carrier assembly for guiding the workpiece carrier during its vertical movement
14 horizontal guide rails of the workpiece carrier support, for guiding the workpiece carrier assembly during its horizontal movement
15 drive system for driving workpiece carrier assembly 16 horizontal guide rails for the tool carriers
17 drive system for driving the tool carriers
18 motor spindles
19 blocking elements
20 drive system for driving workpiece carrier
21, 22 tool carriers
50 computer
100, 101, 102, 103 tools
1000 connecting rod (blank)

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A machine tool for machining connecting rods for a reciprocating piston engine, the machine tool comprising:
a workpiece carrier assembly (11) including a workpiece carrier (12), the workpiece carrier (12) supporting a plurality of connecting rod workpieces (1000);
a workpiece carrier support (1), supporting the workpiece carrier assembly (11) for horizontal movement thereon in a first direction parallel with a horizontal Z axis;
a first tool carrier (21) having a plurality of spindles, the plurality of spindles carrying a first plurality of tools (102, 103) for simultaneously machining the plurality of connecting rod workpieces (1000) by rotating the first plurality of tools (102, 103) around an axis parallel with the Z axis;
a tool carrier support (2), supporting the first tool carrier (21) for horizontal movement in a direction parallel with a horizontal X axis, perpendicular to the Z axis;
the first tool carrier (21) being laterally displaceable on the tool carrier support (2) with respect to the workpiece carrier assembly (11) between an operative position in which each of the first plurality of tools (102, 103) are capable of contacting the plurality of connecting rod workpieces (1000) and an inoperative position, laterally offset from the workpiece carrier assembly (11), in which the plurality of connecting rod workpieces (1000) are not contactable by the first plurality of tools (102, 103),
a second tool carrier (22), having a plurality of spindles, the plurality of spindles carrying a second plurality of tools (100, 101) for simultaneously machining the plurality of connecting rod workpieces (1000) by rotating the second plurality of tools (100, 101) around an axis extending parallel with the Z axis,
the second tool carrier (22) supported on the tool carrier support (2) for horizontal movement in a direction parallel with the horizontal X axis, perpendicular to the Z axis;
the second tool carrier (22) being laterally displaceable on the tool carrier support (2) with respect to the workpiece carrier assembly (11) between an operative position in which each of the second plurality of tools (100, 101) are capable of contacting the plurality of connecting rod workpieces (1000) and an inoperative position, laterally offset from the workpiece carrier assembly (11), in which the plurality of connecting rod workpieces (1000) are not contactable by the second plurality of tools (100, 101).

2. The machine tool according to claim 1, wherein the workpiece carrier support (1) extends towards a central portion of the tool carrier support (2), the tool carrier support (2) further comprising two side portions, whereby the inoperative position of the first tool carrier (21) corresponds to one of the side portions, and wherein the inoperative position of the second tool carrier (22) corresponds to the other side portion.

3. The machine tool according to claim 2, wherein the workpiece carrier support (1) and the tool carrier support (2) together form a T configuration, when viewed from above.

4. The machine tool according to claim 1, wherein the first plurality of tools (102, 103), and the second plurality of tools (100, 101) are each placed at a height of not less than 0.7 m and not more than 1.8 m over a floor on which an operator walks when servicing the machine tool.

5. The machine tool according to claim 1, wherein the workpiece carrier (12) is mounted on the workpiece carrier assembly (11) so that the workpiece carrier (12) is displaceable in a vertical direction.

6. The machine tool according to claim 1, wherein the workpiece carrier support (1) and the tool carrier support (2) are placed on a floor and support the workpiece carrier assembly (11), the first tool carrier (21) and the second tool carrier (22) from below.

7. The machine tool according to claim 1, wherein the workpiece carrier support (1) and the tool carrier support (2) each have respective heights of not more than 1.1 m.

8. The machine tool according to claim 1, wherein the workpiece carrier (12) supports 4-8 connecting rod workpieces.

9. The machine tool according to claim 1, wherein the first plurality of tools (102, 103) and the second plurality of tools (100, 101) are each placed at a height of not less than 1.1 m and not more than 1.5 m over a floor on which an operator walks.

10. The machine tool according to claim 1, wherein the workpiece carrier support (1) and the tool carrier support (2) each have respective heights of not more than 0.6 m.

11. The machine tool according to claim 1, wherein the reciprocating piston engine is for an automobile or a truck.

12. The machine tool according to claim 1, wherein the first tool carrier (21) and the second tool carrier (22) are independently displaceable in one of multiple positions from one another along the tool carrier support (2).

13. The machine tool according to claim 1, wherein the first tool carrier (21) and the second tool carrier (22) are independently displaceable on the tool carrier support (2), so that the first tool carrier can be displaced between its operative and its inoperative position by displacement on the tool carrier support (2) while the second tool carrier remains in its inoperative position, and the second tool carrier can be displaced between its operative and its inoperative position by displacement on the tool carrier support (2) while the first tool carrier remains in its inoperative position.

14. The machine tool according to claim 1, wherein the first tool carrier (21) and the second tool carrier (22) are independently displaceable on the tool carrier support (2), so that one of the first tool carrier and the second tool carrier can be displaced between its operative position and its inoperative position while the other one of the first tool carrier and the second tool carrier is in its inoperative position.

15. The machine tool according to claim 1, wherein the workpiece carrier support (1) extends towards a central portion of the tool carrier support (2), the tool carrier support further comprising two side portions, whereby the inoperative position of the first tool carrier (21) corresponds to a first one of the two side portions, and wherein the inoperative position of the second tool carrier (22) corresponds to a second one of the two side portions, wherein the first tool carrier (21) is arranged so that it can be displaced between the central portion and the first one of the two side portions of the tool carrier support (2) while the second tool carrier (22) remains on the second one of the two side portions, and wherein the second tool carrier (22) is arranged so that it can be displaced between the central portion and the second one of the two side portions of the tool carrier support (2) while the first tool carrier (21) remains on the first one of the two side portions.

* * * * *